(No Model.)

H. C. REGISTER.
DENTAL DISK CARRIER.

No. 362,783. Patented May 10, 1887.

WITNESSES:
E. T. Stuart
A. E. Paige.

INVENTOR:
Henry C. Register,
by his Atty Wm. P. Peyton.

UNITED STATES PATENT OFFICE.

HENRY C. REGISTER, OF PHILADELPHIA, PENNSYLVANIA, ASSIGNOR TO THE S. S. WHITE DENTAL MANUFACTURING COMPANY, OF SAME PLACE.

DENTAL DISK-CARRIER.

SPECIFICATION forming part of Letters Patent No. 362,783, dated May 10, 1887.

Application filed February 2, 1887. Serial No. 226,224. (No model.)

*To all whom it may concern:*

Be it known that I, HENRY C. REGISTER, a citizen of the United States, residing at Philadelphia, in the county of Philadelphia and State of Pennsylvania, have invented certain new and useful Improvements in Disk-Carriers or Mandrels; and I do hereby declare the following to be a full, clear, and exact description of the invention, such as will enable others skilled in the art to which it appertains to make and use the same.

My invention relates to tools or mandrels for carrying cutting, polishing, or abrading disks and to permit of their ready replacement. These disks are sometimes made of sand-paper, cloth, or other similar material; but the particular material or formation of the disk constitutes no part of my present invention, which relates only to the fastening or carrying devices therefor.

The object of my invention is to provide an improved disk-carrier or mandrel, and after first describing it in detail, by aid of the accompanying drawings, I will distinctly recite the subject-matter claimed by me in a summary at the close of this specification.

Figure 1:
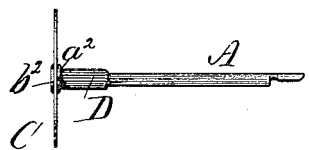
Figure 2:
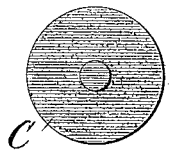
Figure 3:
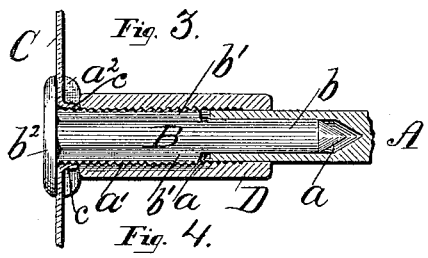
Figure 4:
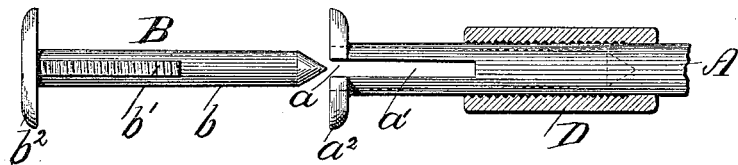

In said drawings, Figure 1 is a view in elevation of my improved disk-carrier or mandrel. Fig. 2 is a face view thereof. Fig. 3 is an enlarged longitudinal sectional view through the front end thereof; and Fig. 4, an enlarged view with the parts of the mandrel or disk-carrier separated, so as to show more clearly the manner of fitting them together to clamp and carry the cutting or abrading disk.

The shank A of the carrier or mandrel may be of the usual or of any approved construction, having a socket, $a$, in the front end and a longitudinal slot, $a'$, fitted to receive, respectively, the cylindrical rear end, $b$, and lateral fins or splines $b'\ b'$ of the feathered pin B. The front end of the shank A is provided with a flattened head, $a^2$, corresponding to the flattened head $b^2$ of the feathered locking-pin B. The cutting, grinding, or abrading disk C is provided with a central opening for the passage through it of the shank and splines or ribs of the locking-pin B, whereby said disk may be firmly clamped and held between the headed ends of the shank A and pin B, so as to be driven with and form part of the mandrel A.

In order to lock the two heads $a^2\ b^2$ together and upon the interposed disk C, the edges of the feathers or ribs $b'$ of the locking-pin B are screw-threaded and fitted to receive a nut, D, sliding upon the shank A. Upon screwing up said nut D upon the threaded splines or ribs $b'$ the head $b^2$ of the locking-pin B is drawn up firmly against the interposed disk C, and obviously locks it firmly to the shank or mandrel A. I prefer, in fastening disks which may be made out of soft material—such as cloth or sand-paper, for example—to permit the splines, feathers, or ribs $b'$ to cut out lips $c\ c$ at the center of the disk, so that said lips lie parallel with said ribs or splines to aid in the formation of the driving-connection between the disk and mandrel. This is particularly shown in Fig. 3.

I claim as my invention—

The combination of the socketed shank or mandrel, the feathered and headed locking-pin, and the screw or clamp nut fitted to work on the threaded edges of said locking-pin, substantially as described.

In testimony whereof I affix my signature in presence of two witnesses.

HENRY C. REGISTER.

Witnesses:
LISLE STOKES,
LEVI TEAL.